(12) United States Patent
Krishnamurthy et al.

(10) Patent No.: US 12,333,839 B2
(45) Date of Patent: Jun. 17, 2025

(54) NEURAL NETWORK ARCHITECTURE FOR CLASSIFYING DOCUMENTS

(71) Applicant: UST Global (Singapore) Pte. Limited, Singapore (SG)

(72) Inventors: Dasaprakash Krishnamurthy, Chennai (IN); José Pablo Romero Valle, Salamanca (ES); Álvaro Hernández Hernández, Salamanca (ES)

(73) Assignee: UST Global (Singapore) Pte. Limited, Singapore (SG)

( * ) Notice: Subject to any disclaimer, the term of this patent is extended or adjusted under 35 U.S.C. 154(b) by 353 days.

(21) Appl. No.: 17/816,940

(22) Filed: Aug. 2, 2022

(65) Prior Publication Data

US 2023/0334885 A1    Oct. 19, 2023

(30) Foreign Application Priority Data

Apr. 18, 2022   (IN) .............................. 202211022816

(51) Int. Cl.
| | | |
|---|---|---|
| *G06V 30/00* | (2022.01) | |
| *G06V 10/82* | (2022.01) | |
| *G06V 30/14* | (2022.01) | |
| *G06V 30/148* | (2022.01) | |

(Continued)

(52) U.S. Cl.
CPC ........ *G06V 30/19173* (2022.01); *G06V 10/82* (2022.01); *G06V 30/1448* (2022.01); *G06V 30/148* (2022.01); *G06V 30/1918* (2022.01); *G06V 30/41* (2022.01)

(58) Field of Classification Search
CPC ............. G06V 30/19173; G06V 10/82; G06V 30/1448; G06V 30/148; G06V 30/1918; G06V 30/41; G06V 30/147
See application file for complete search history.

(56) References Cited

U.S. PATENT DOCUMENTS

2019/0205649 A1\* 7/2019 Ananthanarayanan ...................... G06V 10/87
2021/0073585 A1\* 3/2021 Chuang ................ G06V 10/764
(Continued)

FOREIGN PATENT DOCUMENTS

WO   WO-2022035942 A1 \*  2/2022  ............. G06F 16/35

OTHER PUBLICATIONS

Coates et al an analysis of single-layer networks in unsupervised feature learning, Proceedings of the Fourteenth International Conference on Artificial Intelligence and Statistics, PMLR 15:215-223 (Year: 2011).\*

*Primary Examiner* — Xiao Liu
(74) *Attorney, Agent, or Firm* — Workman Nydegger (57) ABSTRACT

A system to classify image of a document using neural network architecture is provided. The system includes a storage device storing the image derived from the document having text information. The system includes a document importer operable to perform optical character recognition to convert image data in the image to machine readable data. The system includes a neural network that perform semantic enrichment and positional context for the terms of interest present in the image. The neural network is configured to take as input the machine-readable data and the image and combine both the machine-readable data and the image to classify the image of the document based on the positional context of the terms of interest.

10 Claims, 8 Drawing Sheets

(51) Int. Cl.
  *G06V 30/19* (2022.01)
  *G06V 30/41* (2022.01)

(56) References Cited

U.S. PATENT DOCUMENTS

2021/0224977 A1* 7/2021 Jia ........................... G06F 18/24
2023/0326191 A1* 10/2023 Li ........................... G06N 3/096
                                                              382/155

* cited by examiner

NEURAL NETWORK ARCHITECTURE FOR CLASSIFYING DOCUMENTS

FIELD

The present disclosure relates generally to a document classification system, and more specifically, to a method and system to allow unified classification of documents from images of the document using neural network architecture.

BACKGROUND

Generally, in a corporate environment, multiple documents are received in paper form or electronic form for review, analysis, categorization, processing purpose. Such as, vendors may send invoices, purchase orders, or a prospecting candidate may send resume, etc.

Particularly, obtaining data from scanned images of documents is a laborious task. For example, many documents such as invoices delivered in paper form but must be converted to electronically accessible form. In order to access the data electronically, manual labor is usually employed to key in data from physical documents or images of such documents. Such methods are time consuming and may suffer from accuracy due to human error in keying in data. Therefore, document classification models were developed to extract data, for e.g., text from the documents and categorize the documents into desired classes such that the class signifies a particular type of document. For example, the document classifier may assist in identifying documents representing invoices from a pool of multiple documents. Such document classifiers as known in the art may ease to retrieve data from the invoices, or any other scanned image of the document and mark the document in a particular category.

However, existing document classification relies mainly on text-based models. The known document classification approaches use multi-modal approach where text will be processed using a neural network, and images will be processed in another neural network and then concatenated to classify the document.

In some known aspects of the techniques, optical character recognition (OCR) technology is used to process text from the scanned images of the document. The OCR retrieves translated text, and the document classifier neural network may be able to understand occurrence of keywords in the text and accordingly classify the document. However, all data on a document image, including irrelevant data, will be produced by the OCR process. A keyword search without any correlation with the context in which the keyword is occurring may not be the most efficient manner to classify the document.

Thus, human intervention is still required to properly determine relevant text from the OCR produced text and classify the document. When such data is extracted and cleaned up after the OCR process, a text search from the extracted data may be performed to determine the relevant data so that the document may be classified based on occurrence of specific keywords. This process is also error prone because the OCR cannot properly format data that is oriented in anything but horizontal lines in a document.

Further, conventional machine learning techniques for document extraction usually require thousands of example documents as training data. The exemplary documents must include appropriate keywords at specific positions in the document, such that specific document layouts and information can be learned. A huge amount of training data will ensure that changes in layout, or minor departures from the layout can be recognized by the conventionally trained machine learning models. Drawbacks to having a huge amount of training data include costs associated with preparing the training data (e.g., annotating locations of keywords in example documents). For supervised learning, economic costs associated with the training can increase drastically with the increase in number of exemplary documents.

Thus, there is a need for a unified system and method that allows classification of the image of the document based on occurrence of keywords and considering a positional context of keywords. There is also a need for a unified system and method that employs machine learning to classify documents based on the image of the document with limited set of training data.

SUMMARY

One disclosed example is document extraction system for extracting data from an invoice. The invoice can be a scanned image and can be in any format. This is especially useful in cases where the system is expected to process invoices from different vendors and hence cannot follow a standard format.

According to some implementations of the present disclosure, a system to extract data from regions of interest on a document is provided. The system includes a storage device, a document importer, and a neural network. The storage device stores an image derived from a document having text information. The document importer is configured to perform optical character recognition to convert image data in the image to machine readable data, perform semantic enrichment and positional context for the terms of interest present in the document image. The neural network is configured to take as input the machine-readable data and the image. The neural network is configured to perform semantic enrichment by highlighting the terms of interest in the image based on the machine-readable data. The neural network splits the image into four quadrants for identifying a positional context of the terms of interest in the quadrants. The neural network generates a model representation for each of the quadrants. The neural network concatenates the model representations of the quadrants; and classifies the image based on the concatenated model representations.

According to some implementations of the present disclosure, a method for extracting data from regions of interest from a document is provided. The method includes (a) receiving an image of the document, (b) storing the image of the document in a storage device, (c) converting the image to machine readable data using optical character recognition of a data importer, (d) performing semantic enrichment by highlighting the terms of interest in the image based on the machine-readable data (e) splitting the image into four quadrants for identifying positional context of the terms of interest in the quadrants (f) generating a model representation for each of the quadrants (g) concatenating the model representations of the quadrants; and (h) classifying the image based on the concatenated model representations.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments are shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings and will herein be described in detail. The present disclosure is an example or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclose relates to a system that classifies the document based on positional context of a term of interest i.e., a keyword specific to a type of document from the image of any document such as an invoice. The system may depend on reading the text in the image and the position of the term of interest in the document so that the current challenges of classifying the documents from the image are overcome. While the examples disclosed herein focus on documents such as invoices or purchase order, the present disclosure is not limited to invoices or purchase order, but rather, is more broadly applicable to any image of the documents having similarly arranged information as invoices, such as credit card agreements, and other documents having information about the terms of interest and the position of the terms of interest, and particularly where the information or content on the document appears in different positions and arrangements or layouts for different creators or authors of the documents.

Conventional machine learning systems for document classification have drawbacks in terms of amount of data required and availability of the required data. It is unclear how much data is required for training, and if the data available for training does not provide a good enough performance, data availability can hamper further training and hamper accuracy of the system. Conventional machine learning systems also must consider performance (i.e., number of documents that can be processed per unit time), hardware infrastructure (i.e., speed of components of the computing systems), productivity tools (e.g., ability to receive human feedback), and amount of specific domain knowledge required. Machine learning systems geared towards a first domain are not versatile to being applied to a second domain without training the systems to handle the second domain.

Document classification such as classifying based on type of document, quality, relevance, similarity, or splitting the document is a challenging problem in the intelligent document processing space. This space includes, e.g., insurance forms, purchase orders, invoices, receipts, contract tables, resumes etc., where documents of different templates, image sizes, resolutions and qualities must be classified. Thus, embodiments of the present disclosure provide end-to-end document classification by using the image of the document using deep learning and image enrichment with few-shot learning. Embodiments of the present disclosure use deep learning, position context awareness, image enrichment for the classification of the document. Embodiments of the present disclosure use few-shot learning and do not require rules or heuristics to perform the classification. Few shot learning can use as few as 100 documents for training and can classify documents from different domains.

Figure 1:
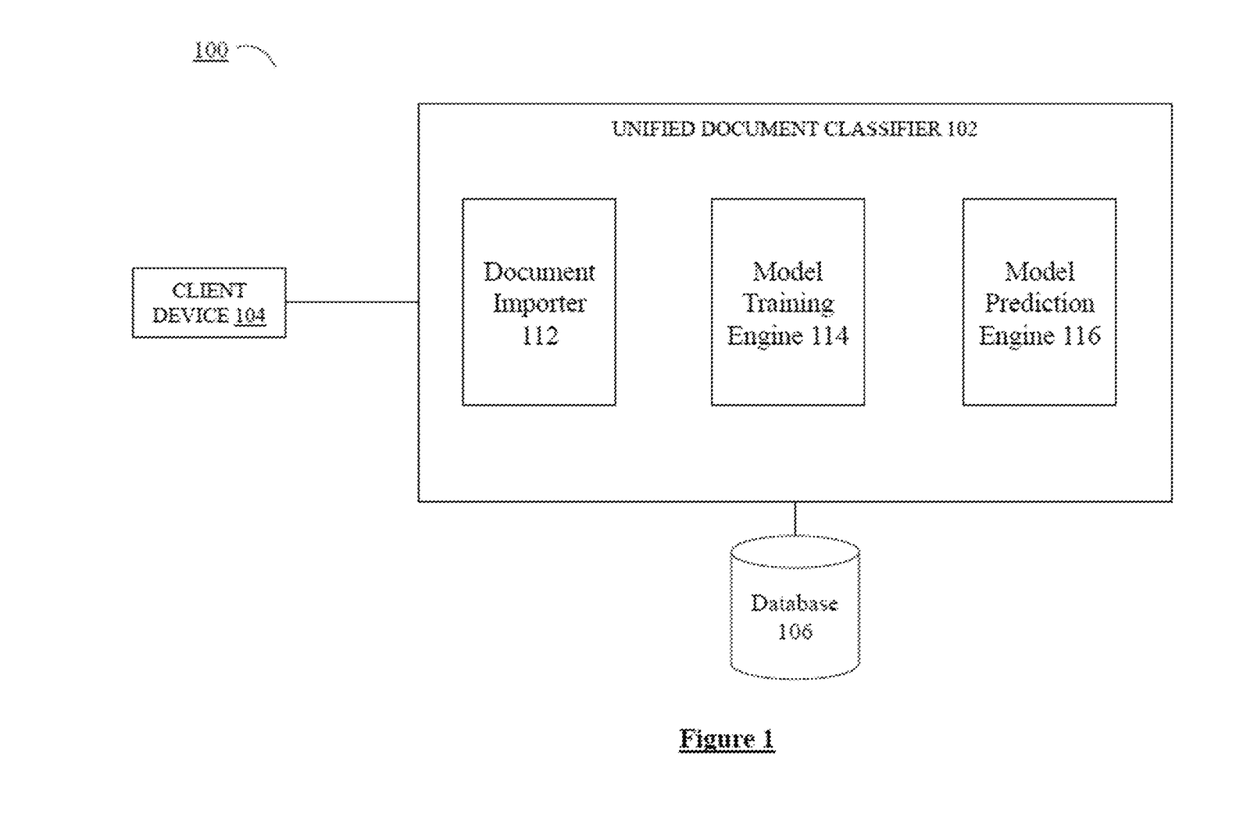
FIG. 1 illustrates a block diagram of an exemplary unified document classifier system, according to an embodiment of the present invention.

FIG. 1 illustrates a block diagram of an exemplary unified document classifier system 100 according to an embodiment of the present invention. To simplify the discussion, the singular form will be used for components identified in FIG. 1 when appropriate, but the use of the singular does not limit the discussion to only one of each such component. The system 100 may include a client device 104, a unified document classifier 102, and a database 106. Each of these components can be realized by one or more computer devices and/or networked computer devices. The computer devices include at least one processor with at least one non-transitory computer readable medium.

The client device 104 is any computing device that can provide commands to or that can communicate with the unified document classifier 102 and request the unified document classifier 102 to perform classification of the document. In an embodiment, the client device 104 may also provide the unified document classifier 102 one or more document images for classification of the image of the document. In an example, the client device 104 may include a laptop computer, a desktop computer, a smartphone, a smart speaker, a smart television, a scanner, a PDA, etc.

The unified document classifier 102 may be in communication with the database 106 for storage of various parameters, document images, and configuration data. For example, model parameters for the machine-learned model may be stored in the database 106, scanned document images may be stored in the database 106, document classification settings can be stored in the database 106, labelled data may be stored in the database 106, a predefined user configuration of the document formatting settings may be stored in the database 106, etc. In an example, the predefined user configuration is representative of a term of interest present in the document such that, the term of interest occurs in the image of the document.

In an embodiment, the unified document classifier 102 may be a neural network and may include a document importer 112, a model training engine 114, and a model prediction engine 116. An engine is a combination of hardware and software configured to perform specific functionality, as discussed throughout this disclosure. The unified document classifier 102 is configured to receive instructions from the client device 104 for classifying the image of the document. In an example, the client device 104 may provide the unified document classifier 102 with the predefined user configuration. In the example, the predefined user configuration may include the terms of interest which may be present in the document. The terms of interest are specific keywords which may be relevant for a particular document type. For example, 'invoice', 'bill', 'check', 'payment statement' being the terms of interest which may appear in the document when the document type is an invoice. Similarly, 'purchase order', 'PO', 'Goods order' being another set of terms of interest which may appear in the document when the document type is a purchase order.

In an example, based on the occurrence and positional context of the terms of interest in the image of the document, the document is classified. In the example, an invoice submitted by a vendor to the company is first scanned to convert the paper document into image. The unified document classifier 102 may analyze the image of the document and identify the type of document. In the example, the unified document classifier 102 then proceeds to classify the document as the invoice based on the occurrence and positional context of the terms of interest.

In some implementations, the unified document classifier 102 does not have to know the type of document being examined Each of the document importer 112, the model training engine 114, and the model prediction engine 116 identified in FIG. 1 is a combination of hardware and software configured to perform specific functionality as described in the following paragraphs.

In an embodiment, the unified document classifier 102 includes the document importer 112. The document importer 112 is configured to interrogate documents to be examined based on the file format. In an example, the documents may be provided in different file formats. For example, the documents can be provided in an image format (e.g., portable network graphics (PNG) format, tagged image file format (TIFF), Silicon Graphics image file (RGB), graphic interchange format (GIF), portable bitmap formats (e.g., PBM, PGM, PPM), Sun raster bitmap image file format (RAST), raster image file formats (e.g., EXR), JPEG, bitmap formats (e.g., BMP, XBM), etc.), in a video format (e.g., WebP file format), or in any other document format (e.g., portable document format (PDF), open document format (ODF), Microsoft® Word document (DOC), Microsoft® Word Open XML format (DOCX), etc.). In an example, the document importer 112 may include OCR for recognizing text in image files.

In another embodiment, the model training engine 114 trains a machine learning model using training data. The model prediction engine 116 uses the trained machine learning model to provide information in image of the documents to the client device 104. For example, the model training engine 114 can receive training documents from the document importer 112 to train the model, and the model prediction engine 116 can receive documents from the document importer 112 for extracting information using the trained model. In an example, the model training engine 114 trains the machine learning model using few-shot learning approach.

Figure 2:
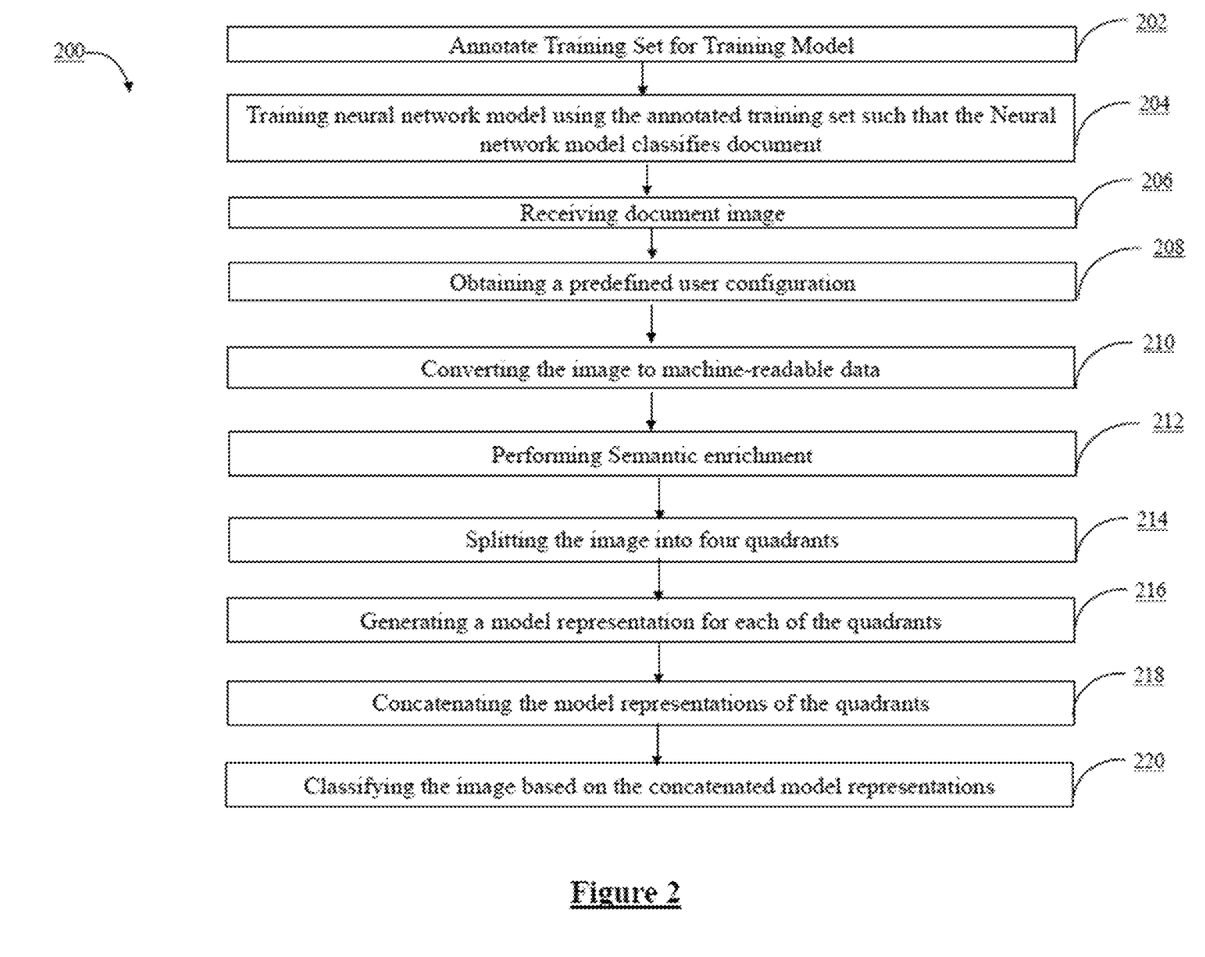
FIG. 2 illustrates a flow diagram depicting a method of learning relevant information from a training set and extracting information from a document image, according to some embodiments of the present invention.

FIG. 2 illustrates a flow diagram depicting a method 200 of learning relevant information from a training set and classifying document from the image, according to some embodiments of the present invention. In an example, the steps in FIG. 2 may be implemented by the client device 104, the unified document classifier 102, or both. At step 202, the method 200 may include the client device 104, in cooperation with the unified document classifier 102. The method 200 may include annotating a training set for training a neural network model. In an example, the training set may include document images. In the example, a document image of the training set may include documents such as invoices, purchase order, etc. The document image may be annotated to indicate the type of document, occurrence of the terms of interest and position of the terms of interest in document image. The document image may be annotated by identifying the document type. In the example, the document image may be annotated for establishing similarity in multiple document images, for assessing document image quality, for splitting document image, etc. In the example, the document images are labelled and the predefined user configuration indicative of term of interest for the document image is stored in the client device 104.

At step 204, the method 200 may include the unified document classifier 102 training the neural network model using the annotated training set, such that the neural network model may be used for identifying the document image type, establishing similarity in multiple document images, for assessing document image quality, for splitting document images, etc. In some implementations, the neural network model being trained is a convolutional neural network (CNN), and training involves adjusting weights of the CNN. The model training engine 114 may iteratively adjust weights associated with the CNN such that the unified document classifier 102 may classify the document image.

At step 206, the method 200 may include the unified document classifier 102 receiving the document and preparing the document image for classification using the document importer 112. In an example, the document images with dimensions of X pixels by Y pixels by Z channels may be formatted to a specific size for use by the unified document classifier 102.

At step 208, the method 200 may include the unified document classifier 102 obtaining the predefined user configuration from the client device 104. In an example, the predefined user configuration may be indicative of the term of interest for the document, according to some embodiments of the present invention.

At step 210, the method 200 may include the unified document classifier 102 converting the document image to a machine-readable data. In an example, the document importer 112 may convert the image of the document to the machine-readable data using Optical Character Recognition (OCR) technique.

At step 212, the method 200 may include the unified document classifier 102 performing semantic enrichment and positional context for the terms of interest, from the prepared document of step 208. In an example, the method 200 may include the unified document classifier 102 highlighting the term of interest in the image of the document based on the machine-readable data.

Further, at step 214, the method 200 may include the unified document classifier 102 splitting the image into a four quadrants. In an example, the unified document classifier 102 split the image into four quadrants for identifying a positional context of the term of interest in the quadrants.

At step 216, the method 200 may include generating a model representation for each of the quadrants.

At step 218, the method 200 may include concatenating the model representations of the quadrants. In an example, the model prediction engine 116 uses the trained neural network to perform the classification using the model representation of the four quadrants.

At step 220, the method 200 may include the unified document classifier 102 prepare classes and classifying the image based on the concatenated model representations.

Figure 3:
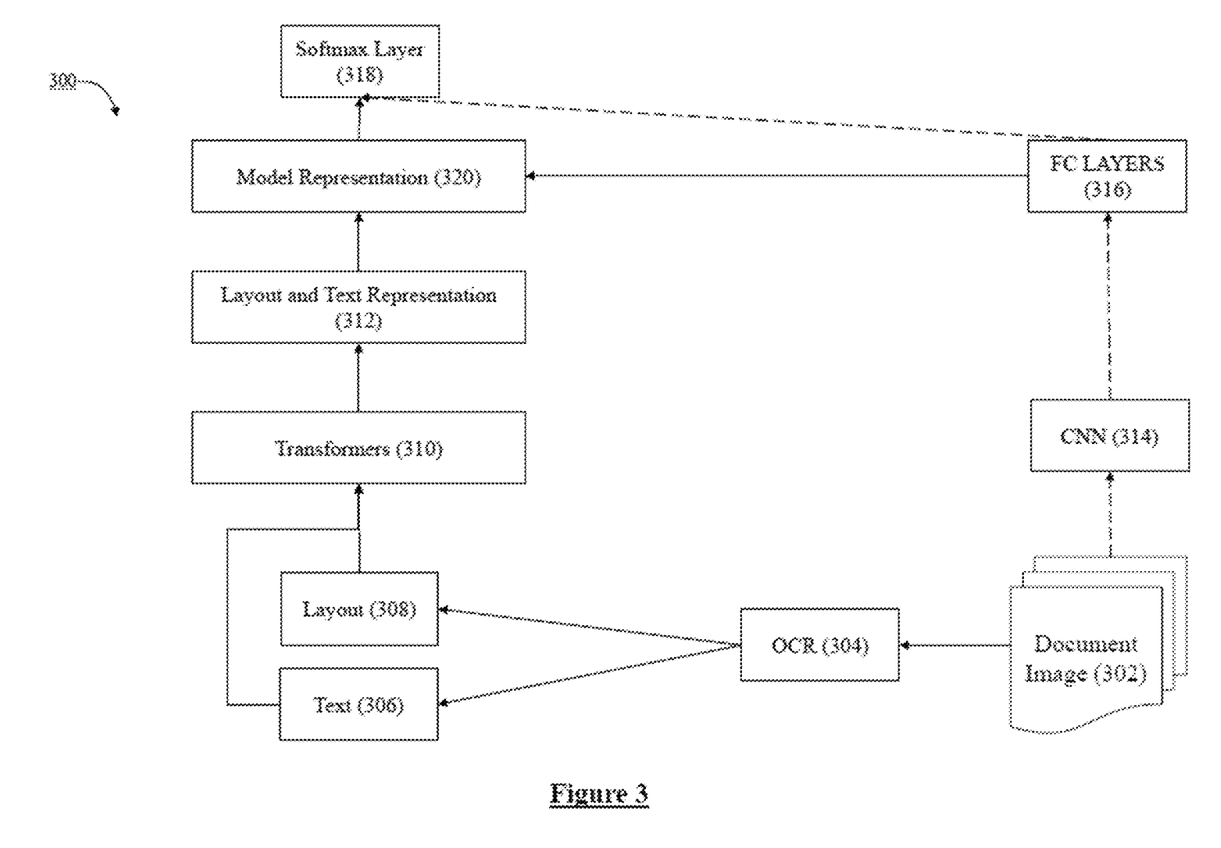
FIG. 3 illustrates a flow diagram depicting a process for classifying the document image through the positional context awareness, according to some embodiments of the present invention.

FIG. 3 illustrates a flow diagram depicting a method 300 for classifying the image 302 of the document using the positional context awareness, according to some embodiments of the present invention. The method 300 may be implemented through the unified document classifier 102. The term image 302 is interoperable with the term document image 302, providing the similar context according to some embodiments of the present invention. Information extraction is typically seen as a language problem or layout problem. Embodiments of the present disclosure provide an ensemble model which uses a language model with layout features and a vision model with language features. Semantic enrichment is performed in parallel with data preparation for vision model. For example, semantic enrichment allows highlighting the terms of interest in the document image 302. In the example, the trained model may be trained using the few-shot learning approach, i.e., with a small number of documents, e.g., about 100 documents, and may generalize to documents or document layouts not previously introduced to the model. In some implementations, the client device 104 may be used to view specific document images selected for classification, and a user of the client device 104 may review the classified document with a click and select.

In FIG. 3, the document image 302 is fed into a CNN 314 and then to fully connected (FC) layers 316. In an example, the FC layers 316 may provide a model representation 318 of the document image 302, i.e., the features/vectors are presented via FC layer 316. This path represents the visual processing or vision modeling side for extracting fields of interest. The SoftMax layer 318 is the activation function in the output layer of neural network models which may be used as the activation function for multi-class classification.

In an embodiment, the method 300 includes performing OCR 304 on the document image 302. In an example, the OCR 304 is performed on the document image 302 to convert the image into machine-readable data. In the example, the OCR enables to obtain text 306 and layout 308 information. In the example, layout 308 information may include co-ordinates of the text 306, particularly the terms of interest, recognized in the document image 302. In the example, the layout 308 information may include distance positioning on the page relative to other text on the page, such as, distance from text positioned above the text 306, distance from text positioned below the text 306, distance from text left of the text 306, and/or distance from text right of the test 306. The layout 308 information may help in positional context awareness for the terms of interest. Once the layout 308 information is obtained, the document image is then converted into a greyscale image. In the example, the grayscale image is then semantically enriched for context awareness by highlighting the terms of interest with different color codes based on the document classes.

In an embodiment, the method 300 includes combination of the text 306 and layout 308 using transformers 310 to obtain layout and text representation 312. The text 306 and the layout 308 information may be represented as multi-dimensional vectors. In an example, the text 306 may be represented as a word embedding with a sequence length of 512. The layout 308 information may be represented as position embedding, coordinate embedding, distance embedding to nearest texts and distance to label embedding. The different embeddings of the text 306 and the layout 308 information can then be added together and passed to the transformers 310. Examples of the transformers 310 may include, but not limited to, Bidirectional Encoder Representations from Transformers (BERT) and PyTorch-Transformers models for natural language processing (NLP). Transformers used for NLP can be used to determine likelihoods that a given word follows another word (e.g., NLP can be used to determine patterns and sequences for understanding context surrounding the text 306). The layout and text representation 312 may be obtained from the transformers 310 in a multi-dimensional vector format.

Figure 4:
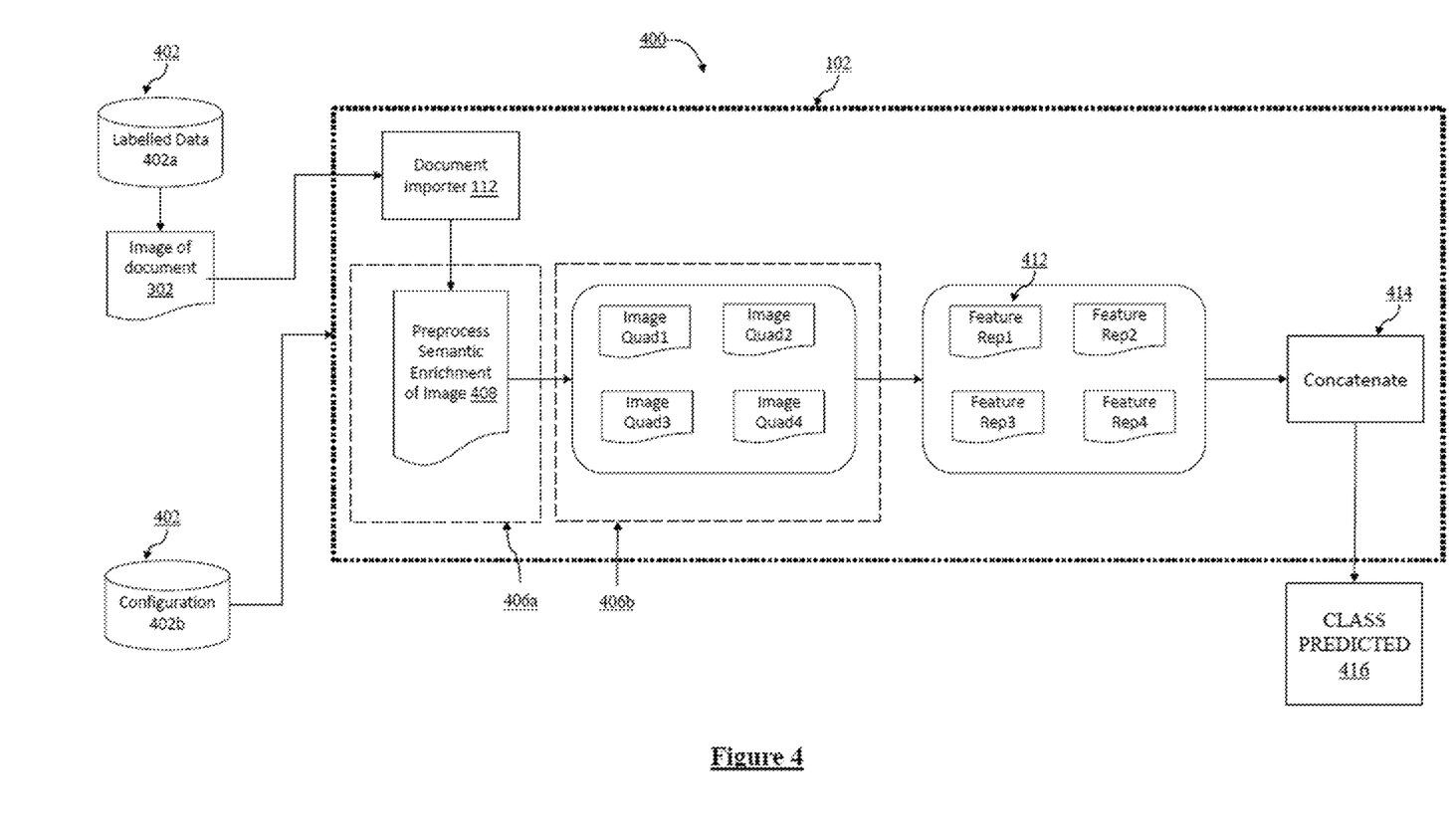
FIG. 4 illustrates an architecture of a convolutional neural network model, according to some embodiments of the present invention.

FIG. 4 illustrates a system 400 representing architecture of a convolutional neural network model, according to some embodiment of the present invention. The convolutional neural network model may be the unified document classifier 102. In an embodiment, at 402, the system 400 includes the labelled data 402a. In an example, a storage device 402 is configured to store the labelled data 402a. The labelled data 402a is indicative of the document image 302. In another example, the storage device 402 is configured to store the predefined user configuration 402b which is indicative of the term of interest for the image document 302. In the example, the document importer 112 converts the image data in the image to machine-readable data using OCR.

In an embodiment, the system 400 includes a first convolutional neural network 406a and a second convolutional neural network 406b. The ResNet-152 is used as backbones of the CNN model 400. ResNet-152 is merely used as an example, and any other CNN backbone for image classification can be used (e.g., AlexNet, VGG, etc.). The CNN model 400 receives the document image 302. In an example, the ResNet-152 backbones are loaded with pre-trained weights. In some implementations, the pre-trained weights are readily available in software packages that implement ResNet-152. The document image 302 is an image of the document which is processed. In the example, the image is processed for semantic enrichment and positional context awareness in the document image 302.

In an embodiment, in the system 400, the first convolutional neural network 406a is configured to perform semantic enrichment 408 of the image document 302. The semantic enrichment may include highlighting the terms of interest in the image based on the machine-readable data.

An output of the first convolutional neural network 406a, i.e., the semantically enriched document is passed to the second convolutional neural network 406b. In an example, the second convolutional neural network 406b is configured to split the document image 302 into four quadrant images for identifying a positional context of the terms of interest in the quadrants. In the example, the second convolutional neural network 406b is configured to convert quadrant images into a shape of 224×224×3.

Further, at 412, the system 400 may include the CNN model for generation of the model representation for each quadrant. In an example, the model representation is equivalent to representation learning which includes the step of taking input data (in this example, the document image 302) and extracting features that enables the CNN model 400 to resolve a particular problem which in this case is classification of the document image 302.

At 414, the system 400 may include the CNN model for concatenating the model representations of the quadrants. In some implementations, the concatenation 414 may include performing 1×1 convolutions. The output of the concatenation 414 is fed into the FC layer. In an example, the FC layer may then predict a class based on the model representation and the predefined user configuration.

At 416, the system 400 may include the CNN model for classifying the document image 302 based on the concatenated model representations 414. In an example, the SoftMax layer is used for classifying the document image 302.

Figure 5:
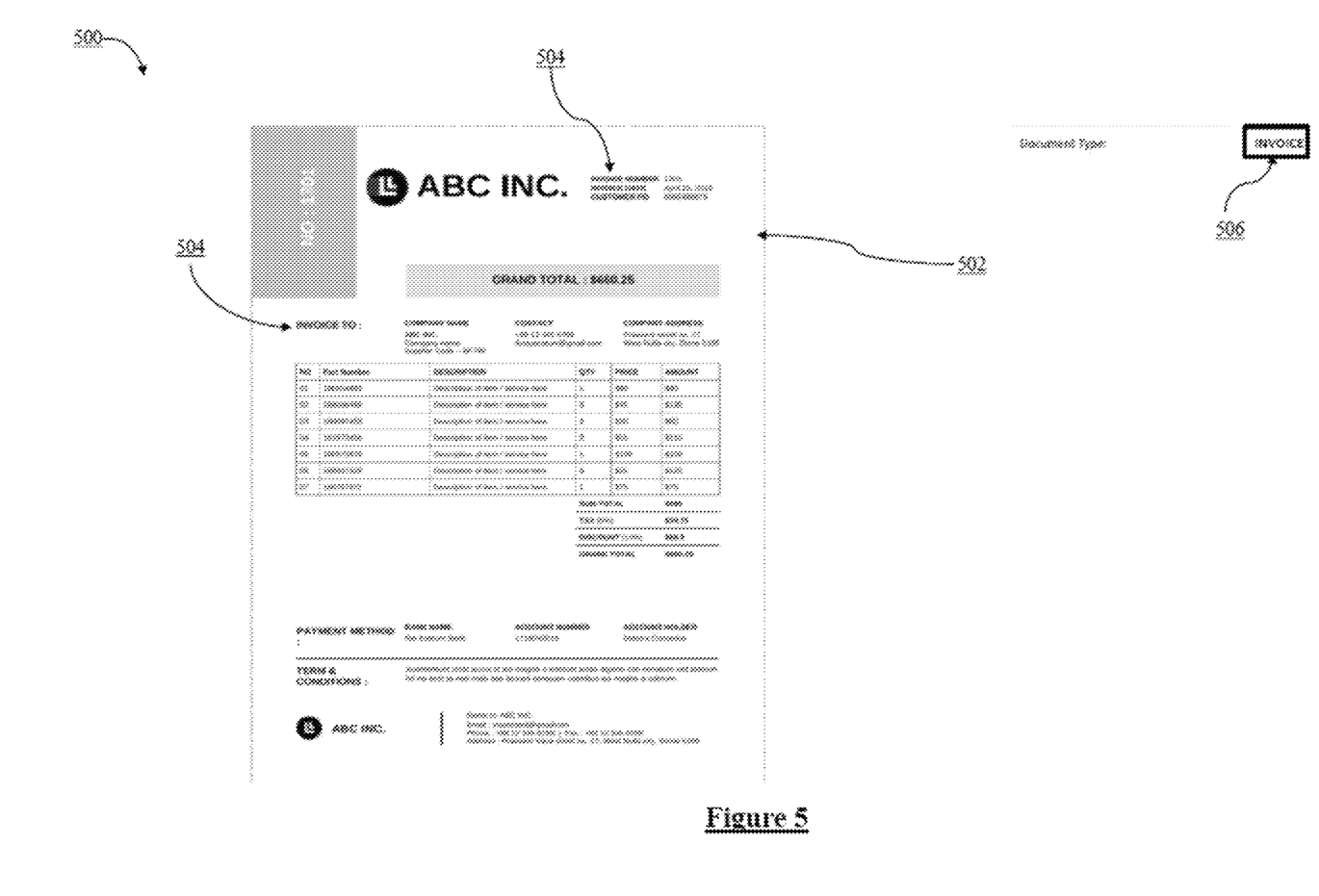
FIG. 5 illustrates an exemplary invoice being classified, according to some embodiments of the present invention.

To illustrate some advantages of some implementations of the present disclosure, an example is discussed herein. FIG. 5 illustrates an exemplary invoice classified with the convolutional neural network model 400, according to some embodiments of the present invention. In the example, the document image 302 is processed to perform semantic enrichment, provide context awareness and further deep learning is used for document image 302 classification. In a first step, an exemplary image processing is applied to semantically enrich images to provide context awareness, and in a second step, the CNN model 400 is trained for the image document classification. In the example, FIG. 5, 502 represents the image document 302. The first convolutional neural network processes the image document 302. In the example, 504 represents the terms of interest being highlighted. The image document 302 is then classified under class "invoice" represented by 506.

Figure 6:
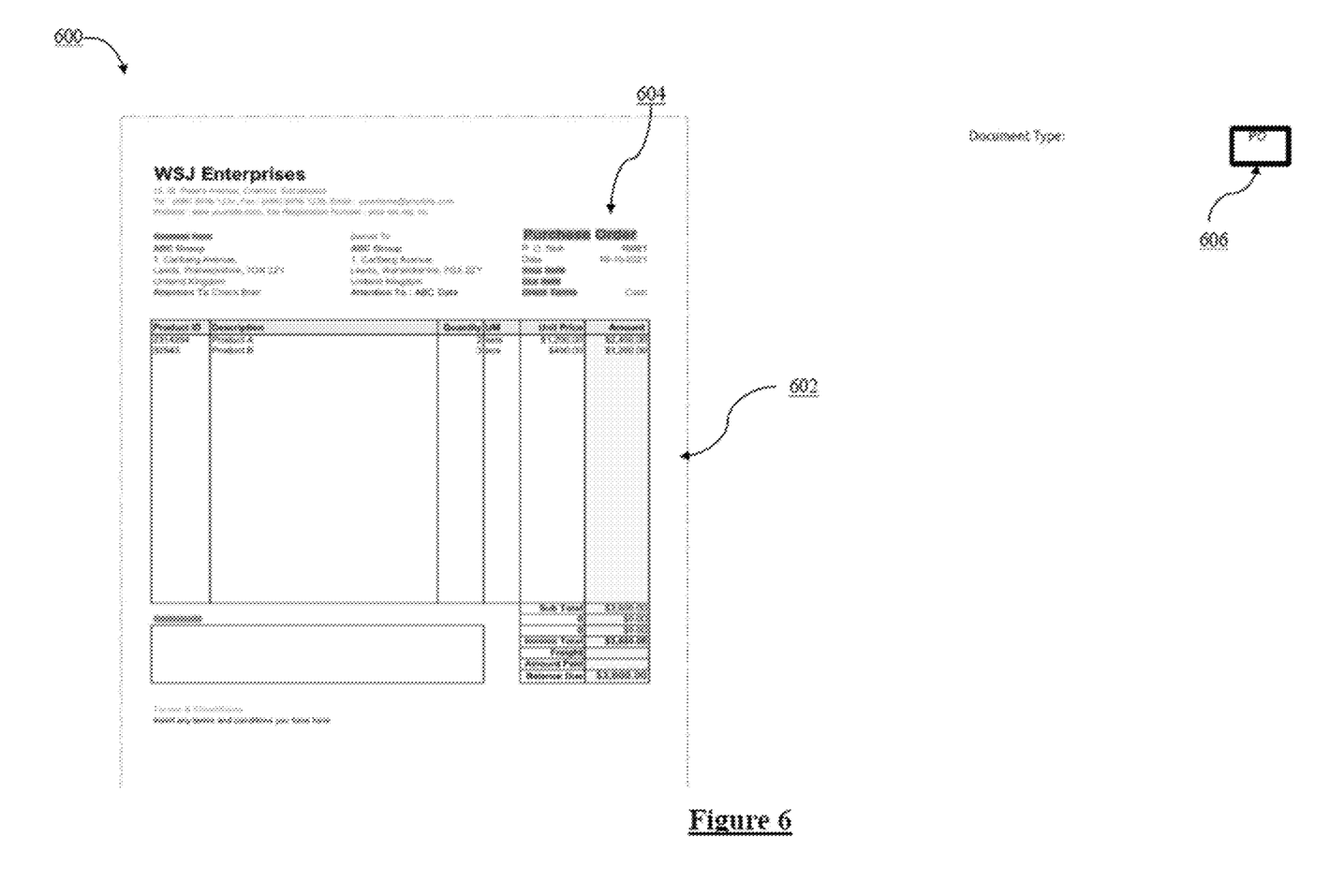
FIG. 6 illustrates an exemplary purchase order classified with the convolutional neural network model, according to some embodiments of the present invention.

Similarly, FIG. 6 illustrates an exemplary purchase order classified with the convolutional neural network model 400, according to some embodiments of the present invention. In the example, FIG. 6, 602 represents the image document 302. The first convolutional neural network processes the image document 302. In the example, 604 represents the terms of interest being highlighted. The image document 302 is then classified under class "PO" represented by 606.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The client device or the computing device as mentioned in the application can include a set of instructions that can be executed to cause the computer system to perform any one or more of the methods disclosed. The computer system may operate as a standalone-device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system can also be implemented as or incorporated across various devices, such as a personal computer (PC), a tablet PC, a personal digital assistant (PDA), a mobile device, a palmtop computer, a laptop computer, a desktop computer, a communications device, a web appliance, a network router, switch or bridge, or any other machine capable of executing a set of instructions (sequential or otherwise) that specify actions to be taken by that machine. Further, while a single computer system is illustrated, the term "system" shall also be taken to include any collection of systems or sub-systems that individually or jointly execute a set, or multiple sets, of instructions to perform one or more computer functions.

The network as referred in the application may include wired networks, wireless networks, Ethernet AVB networks, or combinations thereof. The wireless network may be a cellular telephone network, an 802.11, 802.16, 802.20, 802.1Q or WiMax network. Further, the network may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Figure 7:
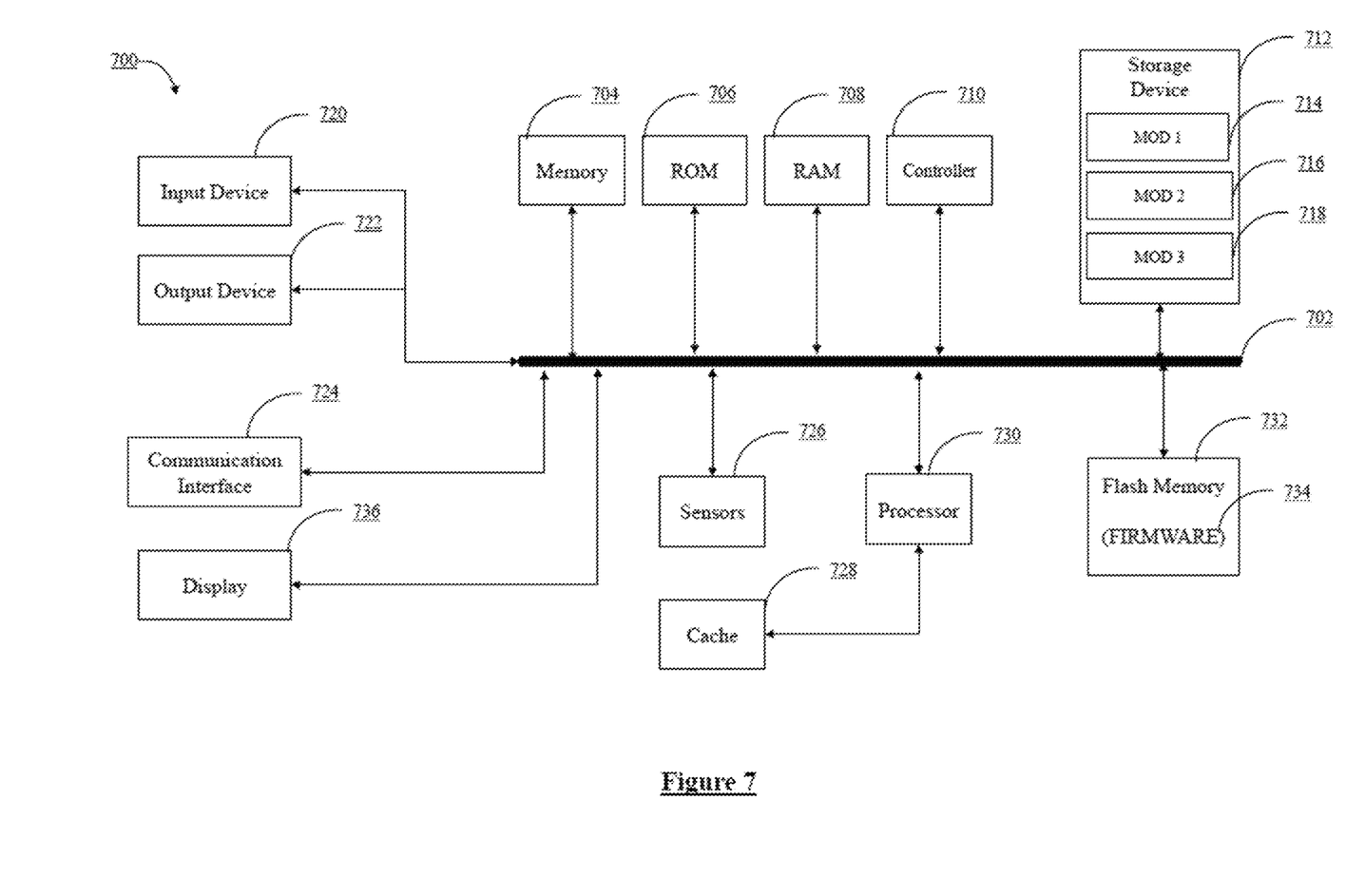
FIG. 7 illustrates an exemplary computer system, according to some embodiments of the present invention.

FIG. 7 illustrates an exemplary computing system 700, according to some embodiments of the present invention. The computing system 700 includes the components of the computing system in electrical communication with each other using a bus 702. The system 700 includes a processing unit (CPU or processor) 730, and a system bus 702 that couples various system components, including the system memory 704 (e.g., read only memory (ROM) 706 and random-access memory (RAM) 708), to the processor 730. The system 700 may include a cache of high-speed memory connected directly with, in proximity to, or integrated as part of the processor 730. The system 700 can copy data from the memory 704 and/or the storage device 712 to the cache 728 for quick access by the processor 730. In this way, the cache 728 may provide a performance boost for processor 730 while waiting for data. These and other modules can control or be configured to control the processor 730 to perform various actions. Other system memory 704 may be available for use as well. The memory 704 may include multiple different types of memory with different performance characteristics. The processor 730 may include any general purpose processor and a hardware module or software module, such as module 1 714, module 2 716, and module 3 718 embedded in storage device 712. The hardware module or software module is configured to control the processor 730, as well as a special-purpose processor where software instructions are incorporated into the actual processor design. The processor 1130 may essentially be a completely self-contained computing system, containing multiple cores or processors, a bus, memory controller, cache, etc. A multi-core processor may be symmetric or asymmetric.

To enable user interaction with the computing device 700, an input device 720 is provided as an input mechanism. The input device 720 can comprise a microphone for speech, a touch-sensitive screen for gesture or graphical input, keyboard, mouse, motion input, and so forth. In some instances, multimodal systems can enable a user to provide multiple types of input to communicate with the system 700. In this example, an output device 722 is also provided. The communications interface 724 can govern and manage the user input and system output.

Storage device 712 can be a non-volatile memory to store data that are accessible by a computer. The storage device 712 can be magnetic cassettes, flash memory cards, solid state memory devices, digital versatile disks, cartridges, random access memories (RAMs) 708, read only memory (ROM) 706, and hybrids thereof.

The controller 710 can be a specialized microcontroller or processor on the system 700, such as a BMC (baseboard management controller). In some cases, the controller 710 can be part of an Intelligent Platform Management Interface (IPMI). Moreover, in some cases, the controller 710 can be embedded on a motherboard or main circuit board of the system 700. The controller 710 can manage the interface between system management software and platform hardware. The controller 710 can also communicate with various system devices and components (internal and/or external), such as controllers or peripheral components, as further described below.

The controller 710 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 710 to initiate or conduct specific hardware recovery procedures or operations, as further described below.

The controller 710 can also include a system event log controller and/or storage for managing and maintaining events, alerts, and notifications received by the controller 710. For example, the controller 710 or a system event log controller can receive alerts or notifications from one or more devices and components and maintain the alerts or notifications in a system event log storage component.

Flash memory 732 can be an electronic non-volatile computer storage medium or chip that can be used by the system 700 for storage and/or data transfer. The flash memory 732 can be electrically erased and/or reprogrammed Flash memory 732 can include EPROM (erasable programmable read-only memory), EEPROM (electrically erasable programmable read-only memory), ROM, NVRAM, or CMOS (complementary metal-oxide semiconductor), for example. The flash memory 732 can store the firmware 734 executed by the system 700 when the system 700 is first powered on, along with a set of configurations specified for the firmware 734. The flash memory 732 can also store configurations used by the firmware 734.

The firmware 734 can include a Basic Input/Output System or equivalents, such as an EFI (Extensible Firmware Interface) or UEFI (Unified Extensible Firmware Interface). The firmware 734 can be loaded and executed as a sequence program each time the system 700 is started. The firmware 734 can recognize, initialize, and test hardware present in the system 700 based on the set of configurations. The firmware 734 can perform a self-test, such as a POST (Power-on-Self-Test), on the system 700. This self-test can test the functionality of various hardware components such as hard disk drives, optical reading devices, cooling devices, memory modules, expansion cards, and the like. The firmware 734 can address and allocate an area in the memory 704, ROM 706, RAM 708, and/or storage device 712, to store an operating system (OS). The firmware 734 can load a boot loader and/or OS and give control of the system 700 to the OS.

The firmware 734 of the system 700 can include a firmware configuration that defines how the firmware 734 controls various hardware components in the system 700. The firmware configuration can determine the order in which the various hardware components in the system 700 are started. The firmware 734 can provide an interface, such as an UEFI, that allows a variety of different parameters to be set, which can be different from parameters in a firmware default configuration. For example, a user (e.g., an administrator) can use the firmware 734 to specify clock and bus speeds; define what peripherals are attached to the system 700; set monitoring of health (e.g., fan speeds and CPU temperature limits); and/or provide a variety of other parameters that affect overall performance and power usage of the system 700. While firmware 734 is illustrated as being stored in the flash memory 732, one of ordinary skill in the art will readily recognize that the firmware 734 can be stored in other memory components, such as memory 704 or ROM 706.

System 700 can include one or more sensors 726. The one or more sensors 726 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 726 can communicate with the processor, cache 728, flash memory 732, communications interface 724, memory 704, ROM 706, RAM 708, controller 710, and storage device 712, via the bus 702, for example. The one or more sensors 726 can also communicate with other components in the system via one or more different means, such as inter-integrated circuit (I2C), general purpose output (GPO), and the like. Different types of sensors (e.g., sensors 726) on the system 700 can also report to the controller 710 on parameters, such as cooling fan speeds, power status, operating system (OS) status, hardware status, and so forth. A display 736 may be used by the 700 to provide graphics related to the applications that are executed by the controller 710, or the processor 730.

Figure 8:
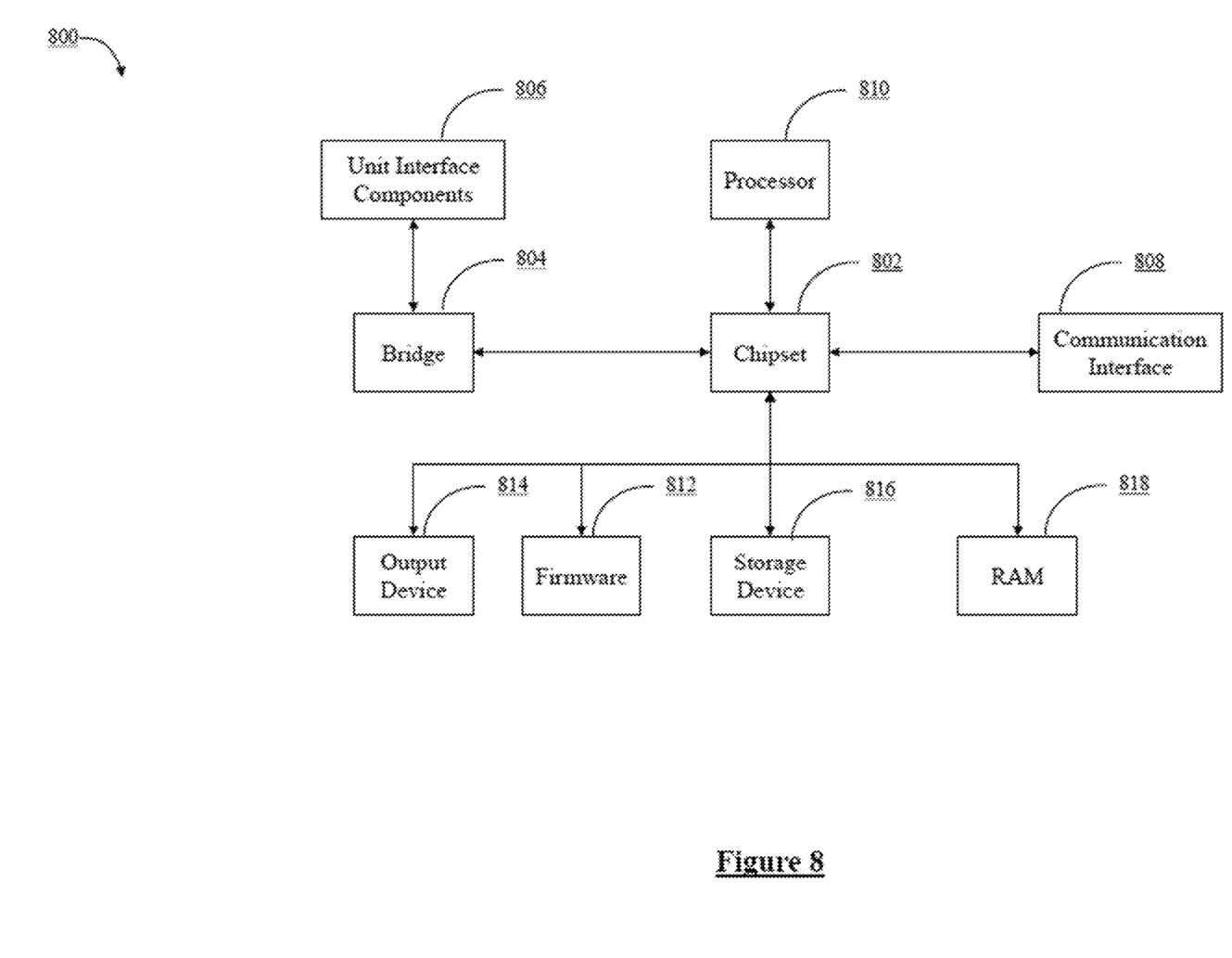
FIG. 8 illustrates an exemplary computer system, according to some embodiments of the present invention.

FIG. 8 illustrates an exemplary computer system 800, according to some embodiments of the present invention. The system 800 having a chipset architecture that can be used in executing the described method(s) or operations and generating and displaying a graphical user interface (GUI). Computer system 800 can include computer hardware, software, and firmware that can be used to implement the disclosed technology. System 800 can include a processor 810, representative of a variety of physically and/or logically distinct resources capable of executing software, firmware, and hardware configured to perform identified computations. Processor 810 can communicate with a chipset 802 that can control input to and output from processor 810. In this example, chipset 802 outputs information to output device 814, such as a display, and can read and write information to storage device 816. The storage device 816 can include magnetic media, and solid-state media, for example. Chipset 802 can also read data from and write data to RAM 818. A bridge 804 for interfacing with a variety of user interface components 806, can be provided for interfacing with chipset 802. User interface components 806 can include a keyboard, a microphone, touch detection and processing circuitry, and a pointing device, such as a mouse.

Chipset 802 can also interface with one or more communication interfaces 808 that can have different physical interfaces. Such communication interfaces can include interfaces for wired and wireless local area networks, for broadband wireless networks, and for personal area networks. Further, the machine can receive inputs from a user via user interface components 806, and execute appropriate functions, such as browsing functions by interpreting these inputs using processor 810.

Moreover, the chipset 802 can also communicate with firmware 812, which can be executed by the computer system 800 when powering on. The firmware 812 can recognize, initialize, and test hardware present in the computer system 800 based on a set of firmware configurations. The firmware 812 can perform a self-test, such as a POST, on the system 800. The self-test can test the functionality of the various hardware components 802-818. The firmware 812 can address and allocate an area in the RAM memory 818 to store an OS. The firmware 812 can load a boot loader and/or OS and give control of the system 800 to the OS. In some cases, the firmware 812 can communicate with the hardware components 802-810 and 814-818. Here, the firmware 812 can communicate with the hardware components 802-810 and 814-818 through the chipset 802, and/or through one or more other components. In some cases, the firmware 812 can communicate directly with the hardware components 802-810 and 814-818.

It can be appreciated that example systems 800 and 800 can have more than one processor (e.g., 810), or be part of a group or cluster of computing devices networked together to provide greater processing capability.

Embodiments of the present disclosure provide a deep-learning model based on object detection and localization networks that are applied on document images to classify documents from images. The model is trained using a small number of training samples so as to avoid the constraint of collecting thousands of images. Collecting thousands of images that fit a certain criteria may not always be possible when considering using applications that involve multiple document types or styles. Embodiments of the present disclosure use image enrichment as a processing technique and apply transfer learning by fine-tuning a pre-trained model from CNN. A unified document classification is realized for document images.

Embodiments of the present disclosure takes the processed enriched image and produces semantically image quadrants for positional context awareness. The image enrichment is done to provide context awareness to the terms of interest detection in an interested quadrant. In an example, the deep-learning model's performance is evaluated using 500 images after training on 100 images. The evaluation target had samples that were hugely dissimilar from the source images (i.e., the training data set). The model has also generalized to other domains like legal documents and finance documents, with minimal fine-tuning using a smaller set of documents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

We claim:

1. A method of classifying a document, comprising:
   receiving, from a storage device, an image of the document;
   obtaining a predefined user configuration indicative of a term of interest for the document;
   converting, by a document importer, the image to machine-readable data using Optical Character Recognition (OCR);
   performing, by a first convolutional neural network, semantic enrichment by highlighting the term of interest in the image based on the machine-readable data;
   splitting, by a second convolutional neural network, the image into four quadrants for identifying a positional context of the term of interest in the quadrants, wherein the first convolutional neural network and the second convolutional neural network are a ResNet-152 model;
   generating a model representation for each of the quadrants;
   concatenating the model representations of the quadrants; and
   classifying the image based on the concatenated model representations.

2. The method of claim 1, further comprising:
   identifying coordinates of the term of interest from the machine-readable data;
   generating a grayscale version of the image based on the identification; and
   performing, by the first convolutional neural network, the semantic enrichment of the grayscale version of the image by highlighting the term of interest in the image.

3. The method of claim 1, further comprising:
   converting quadrant images into a shape of 224×224×3; and generating the model representation for each of the quadrant images for the concatenation and classification.

4. The method of claim 1, comprising:
generating the model representation from the four quadrants using a fully connected layer; and
classifying the image using a softmax neural network layer.

5. The method of claim 4, wherein the fully connected layer is trained using a few-shot learning approach.

6. A system for classifying a document, comprising:
a storage device configured to:
store an image derived from a document having text information, and
store a predefined user configuration, indicative of a term of interest for the document;
a document importer configured to:
convert image data in the image to machine-readable data using Optical Character Recognition (OCR); and
a neural network configured to:
perform semantic enrichment by highlighting the term of interest in the image based on the machine-readable data;
split the image into four quadrants for identifying a positional context of the term of interest in the quadrants;
generate a model representation for each of the quadrants;
concatenate the model representations of the quadrants; and
classify the image based on the concatenated model representations,
wherein the neural network comprises a first convolutional neural network to process the machine-readable data for semantic enrichment and a second convolutional neural network to split the image, wherein the first convolutional neural network and the second convolutional neural network are a ResNet-152 model.

7. The system of claim 6, wherein the document importer is further configured to:
identify coordinates of the term of interest from the machine-readable data; and
generate a grayscale version of the image based on the identification, and
wherein the first convolutional neural network is configured to perform the semantic enrichment of the grayscale version of the image by highlighting the term of interest in the image.

8. The system of claim 6, wherein the neural network is configured to:
convert quadrant images into a shape of 224×224×3; and
generate the model representation for each of the quadrant images for the concatenation and classification.

9. The system of claim 6, wherein the neural network further comprises:
a fully connected layer to generate the model representation from the four quadrants; and
a softmax layer to classify the image.

10. The system of claim 9, wherein the fully connected layer is trained using a few-shot learning approach.

* * * * *